US006912972B1

(12) United States Patent
Tsai

(10) Patent No.: US 6,912,972 B1
(45) Date of Patent: Jul. 5, 2005

(54) WATER AERATING DEVICE FOR AQUARIUM

(76) Inventor: Ting Feng Tsai, P.O.Box 63-298, Taichung (TW) 406

( * ) Notice: Subject to any disclaimer, the term of this patent is extended or adjusted under 35 U.S.C. 154(b) by 25 days.

(21) Appl. No.: 10/822,457

(22) Filed: Apr. 9, 2004

(51) Int. Cl.$^7$ ............................................. A01K 63/04
(52) U.S. Cl. ..................................... 119/263; 119/261
(58) Field of Search ............................... 119/261, 263; 261/100, 94, 121.2

(56) References Cited

U.S. PATENT DOCUMENTS

| | | | |
|---|---|---|---|
| 5,054,424 A | 10/1991 | Sy | 119/5 |
| 5,127,366 A | 7/1992 | Kim | 119/5 |
| 5,174,239 A | 12/1992 | Sato | 119/5 |
| 5,480,590 A * | 1/1996 | Neshat et al. | 261/30 |
| 5,988,600 A * | 11/1999 | Vento | 261/29 |
| 6,394,423 B1 * | 5/2002 | Vento | 261/29 |
| 6,655,663 B2 * | 12/2003 | Vento | 261/29 |

FOREIGN PATENT DOCUMENTS

DE  4123814 A1 *  1/1993  ............ C02F 3/12

* cited by examiner

*Primary Examiner*—Teri Pham Luu
*Assistant Examiner*—Kimberly S. Smith

(57) ABSTRACT

A water aerating device for an aquarium includes a container having an entrance and an exit, a pipe attached to the entrance of the container, a hose coupled to the pipe, to supply air into the pipe, and a pump may pump the water from the pipe into the container via the entrance of the container, to force the water and the air to flow out through the exit of the container. The single pump may thus be simultaneously used to pump the air into the aquarium, or to generate air bubbles, and to circulate the water in the container. A tube may be attached to the exit of the container, and a fan device may be rotatably attached to a port of the tube, for being rotated by the water flowing out of the outlet of the port.

9 Claims, 6 Drawing Sheets

WATER AERATING DEVICE FOR AQUARIUM

BACKGROUND OF THE INVENTION

1. Field of the Invention

The present invention relates to a water aerating device, and more particularly to a water aerating device for attaching to aquariums and for selectively pumping air into the aquariums, and/or for generating bubbles.

2. Description of the Prior Art

Various kinds of typical water aerating devices and/or water filtering devices have been developed for being attached to aquariums and for pumping air into the aquariums and/or for filtering the water.

For example, U.S. Pat. No. 5,504,424 to Sy, discloses one of the typical water aerating devices and/or water filtering devices, for supplying air into the aquariums, and/or for circulating water within the aquarium. In the typical water aerating device and/or water filtering device, one motor is required for pumping and supplying air into the aquariums, and the other motor is required for circulating water within the aquarium, such that two motors are required, and such that the cost of the aquarium is greatly increased.

U.S. Pat. No. 5,127,366 to Kim and U.S. Pat. No. 5,174,239 to Sato disclose two further typical water pumping devices, for circulating water within the aquarium. In these typical water pumping devices, only one pump is provided and disposed in bottom of the aquarium, to pump and to circulate water within the aquarium.

However, the typical water pumping devices may only be used to pump water and to circulate water within the aquariums, but may not be used to pump or to supply air into the aquariums.

The present invention has arisen to mitigate and/or obviate the afore-described disadvantages of the conventional water pumping or water circulating devices for aquariums.

SUMMARY OF THE INVENTION

The primary objective of the present invention is to provide a water aerating device for attaching to aquariums and for pumping air into the aquariums, and for generating bubbles and/or for circulating the water with only one motor or pump.

In accordance with one aspect of the invention, there is provided a water aerating device for an aquarium, the water aerating device comprising a container including a chamber formed therein, and including an entrance and an exit arranged to allow water to flow into and out of the chamber of the container, a pipe attached to the entrance of the container, a hose coupled to the pipe, to supply air into the pipe, and a pumping device for pumping the water from the pipe into the chamber of the container via the entrance of the container, to force the water and the air to flow out through the exit of the container. The pumping device may thus be simultaneously used to pump the air into the aquarium, or to generate air bubbles, and to circulate the water with only one motor or pump.

The container includes a partition to define the chamber thereof. The pumping device includes a pump attached to the partition of the container, and includes an axle extended into the chamber of the container, and a fan device attached to the axle of the pump for being driven by the pump, to pump the water into and out of the container, and to circulate the water in the aquarium.

The pipe includes an inlet provided therein, and the hose includes a coupler coupled to the inlet of the pipe. The container includes a tub to define the entrance of the container, and the pipe includes a ferrule attached onto the tub of the container.

The tub of the container includes an outer thread provided thereon, and the ferrule of the pipe includes an inner thread to thread with the outer thread of the tub of the container. The container includes at least one sucker member for attaching the container to the aquarium.

A tube may further be provided and attached to the exit of the container to receive the water from the container. The tube includes a manifold having a plurality of orifices to supply the water into the aquarium.

The tube includes a port having an outlet to supply the water into the aquarium, and a fan device rotatably attached to the port of the tube, for being rotated by the water flowing out of the outlet of the port. A frame may further be provided and coupled to the outlet of the port, the fan device is rotatably attached to the frame with a pivot shaft.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
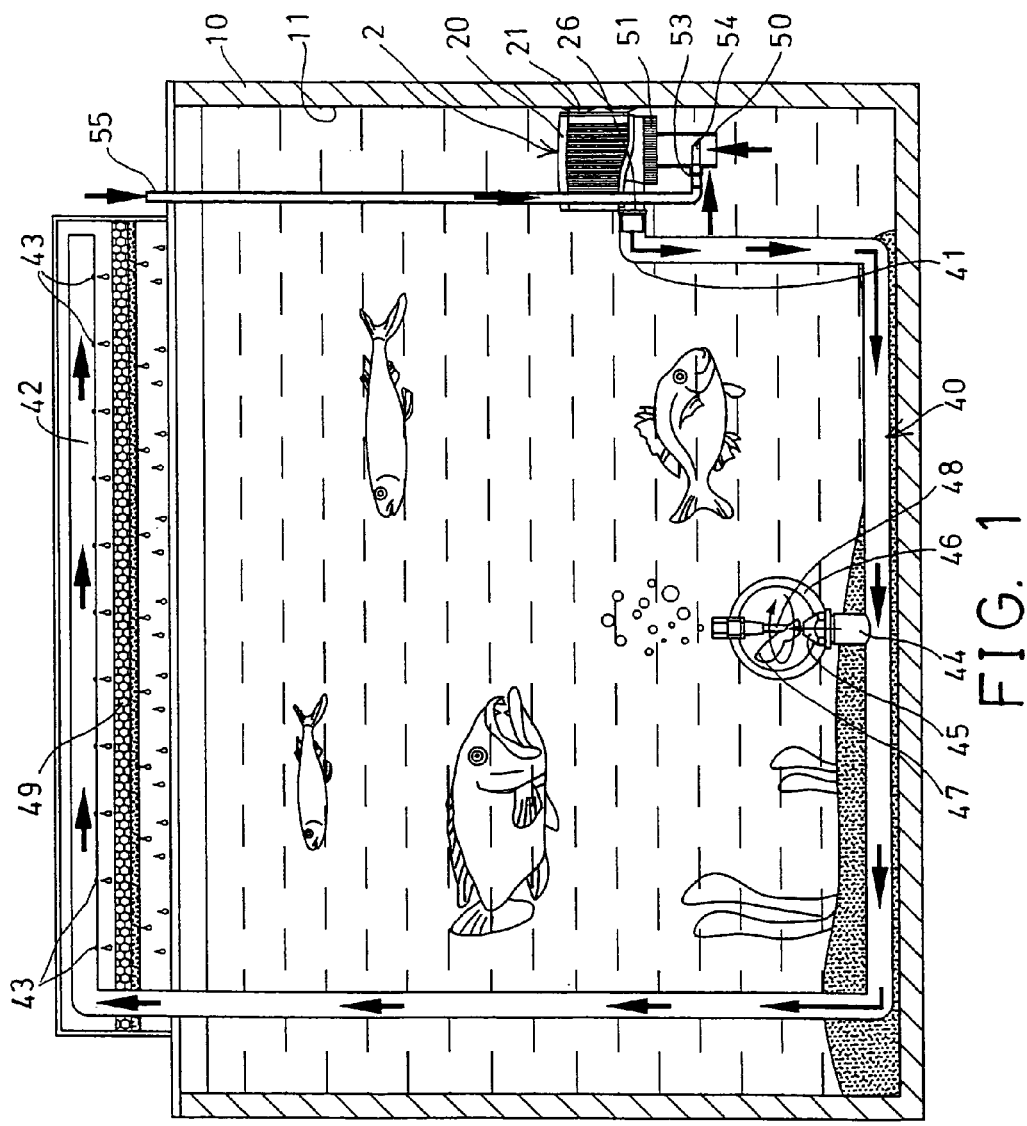
FIG. 1 is a partial cross sectional view illustrating an attachment of a water aerating device in accordance with the present invention to an aquarium.
Figure 2:
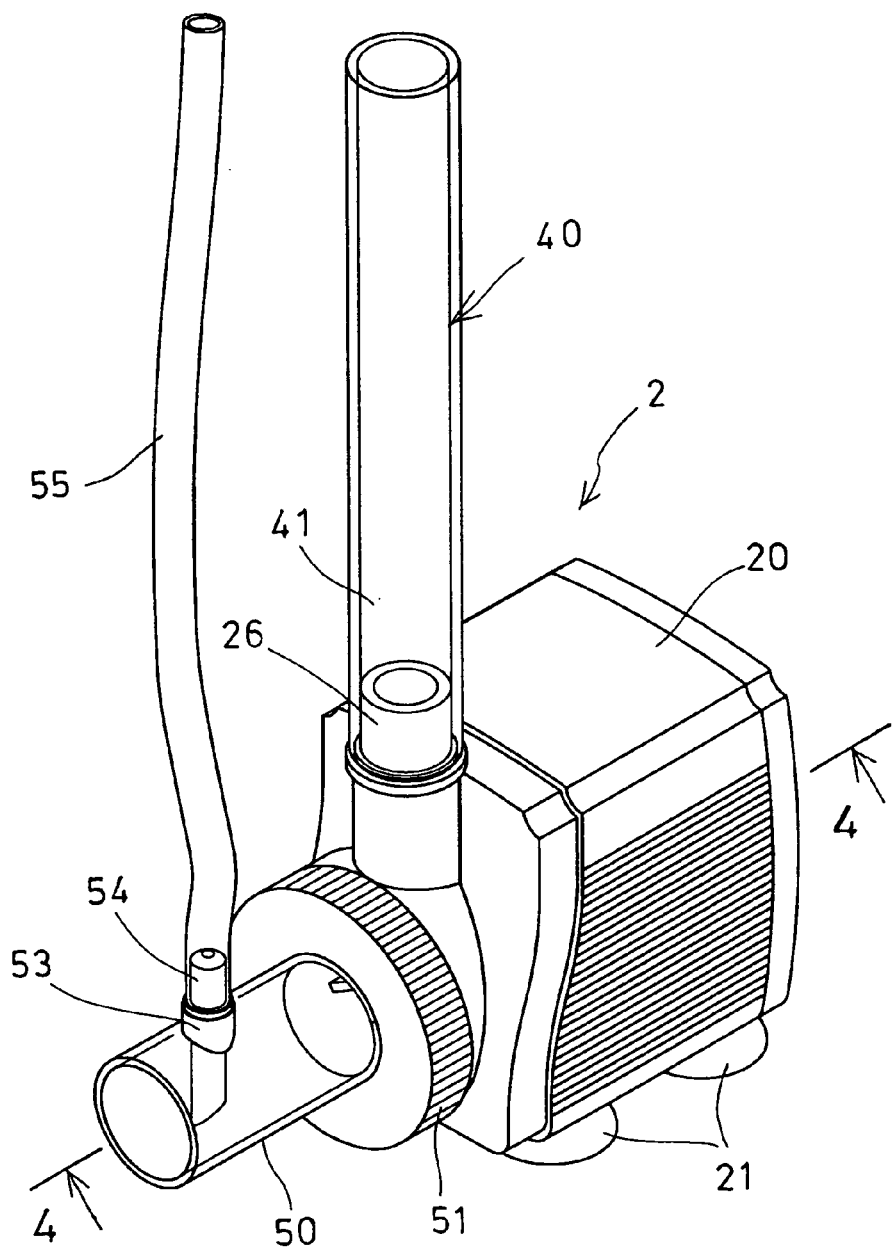
FIG. 2 is an enlarged partial perspective view of the water aerating device for aquariums.
Figure 3:
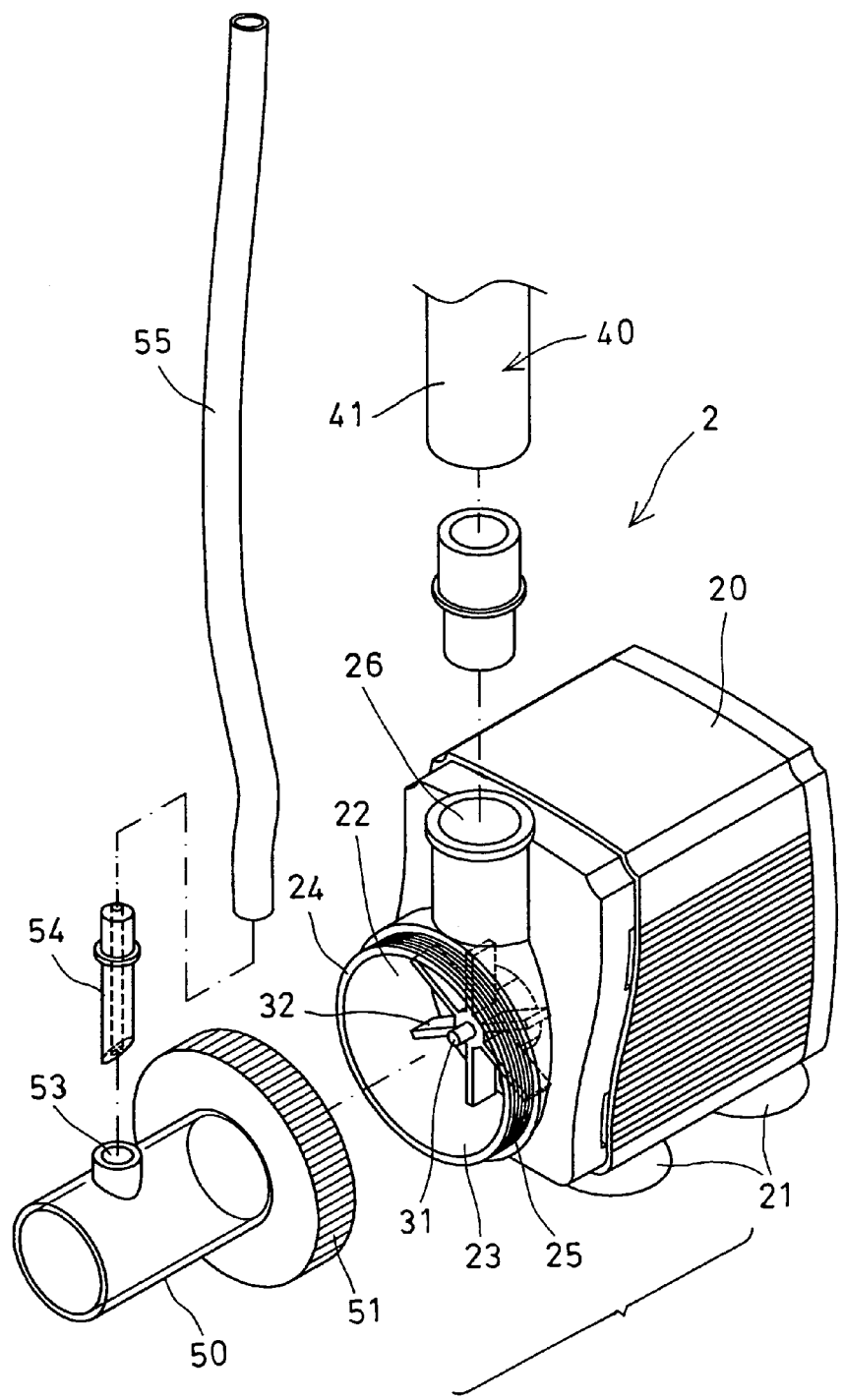
FIG. 3 is a partial exploded view of the water aerating device for aquariums.
Figure 4:
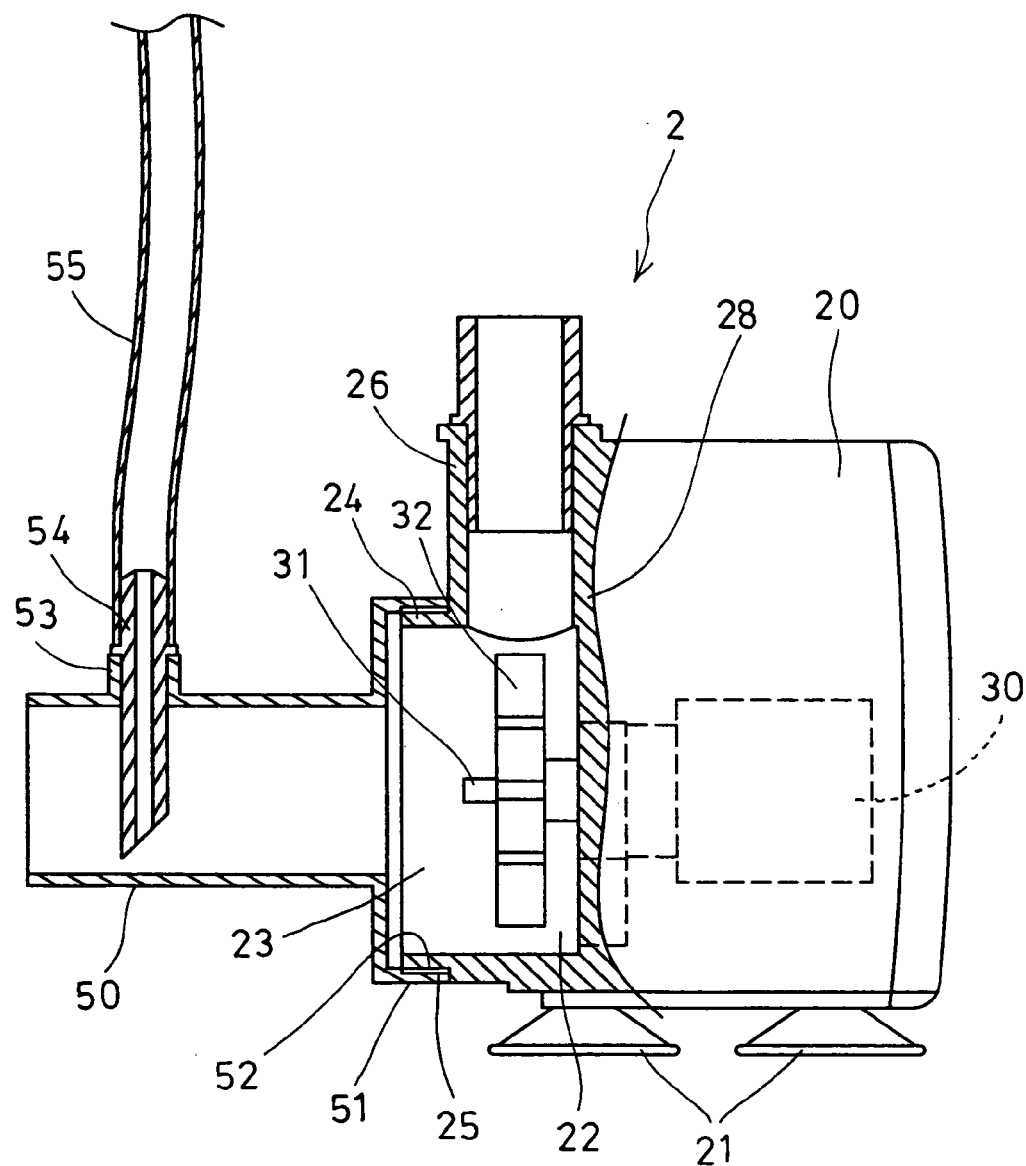
FIG. 4 is a partial cross sectional view taken along lines 4—4 of FIG. 2.

Referring to the drawings, and initially to FIGS. 1–4, a water aerating device in accordance with the present invention is generally designated with a reference numeral 2, and is provided for attaching to an aquarium 10, for pumping air into a space 11 of the aquarium 10, and for circulating the water in the aquarium 10.

The water aerating device 2 comprises a container 20 received in the aquarium 10 and attachable to the aquarium 10 with such as sucker members 21. The container 20 includes a chamber 22 formed therein and defined by a partition 28 (FIG. 4), and includes an entrance 23 and an exit 26 formed or provided thereon, and communicating with the chamber 22 thereof, for allowing the water to flow into and to flow out of the container 20. The container 20 includes a tub 24 provided thereon or extended therefrom, to form or to define the entrance 23 thereof, and an outer thread 25 formed or provided on an outer portion of the tub 24.

A pump 30 is received in the container 20, and attached or secured to the partition 28, and includes an axle 31 extended into the chamber 22 of the container 20, and a fan device 32 is attached or secured to the axle 31 of the pump 30, for being rotated or driven by the pump 30, and for allowing the pump 30 and the fan device 32 to pump the water into and out of the container 20, and thus to circulate the water in the aquarium 10.

A tube 40 includes one end 41 attached or coupled to the exit 26 of the container 20 (FIGS. 1–3 and 5), and may be received and arranged in the container 20, to receive the water, and/or the fresh air from the container 20, and thus to supply the water, and/or the fresh air into the aquarium 10. The tube 40 may further include a manifold 42 extended out of the aquarium 10, and having a number of orifices 43 formed therein to smoothly supply the water into the upper portion of the aquarium 10 (FIGS. 1, 5).

As shown in FIG. 1, the tube 40 may further include a port 44 having an outlet 45 formed or provided therein, to generate air bubbles when the water flows out through the outlet 45 of the port 44. A frame 46 may be attached to the port 44 or to the tube 40, and a paddle wheel or one or more blades 47 may be rotatably attached to the frame 46 or to the port 44 or to the tube 40 with a pivot shaft 48, to allow the blades 47 to be rotated by the air bubbles or the water flowing out through the outlet 45 of the port 44.

Figure 5:
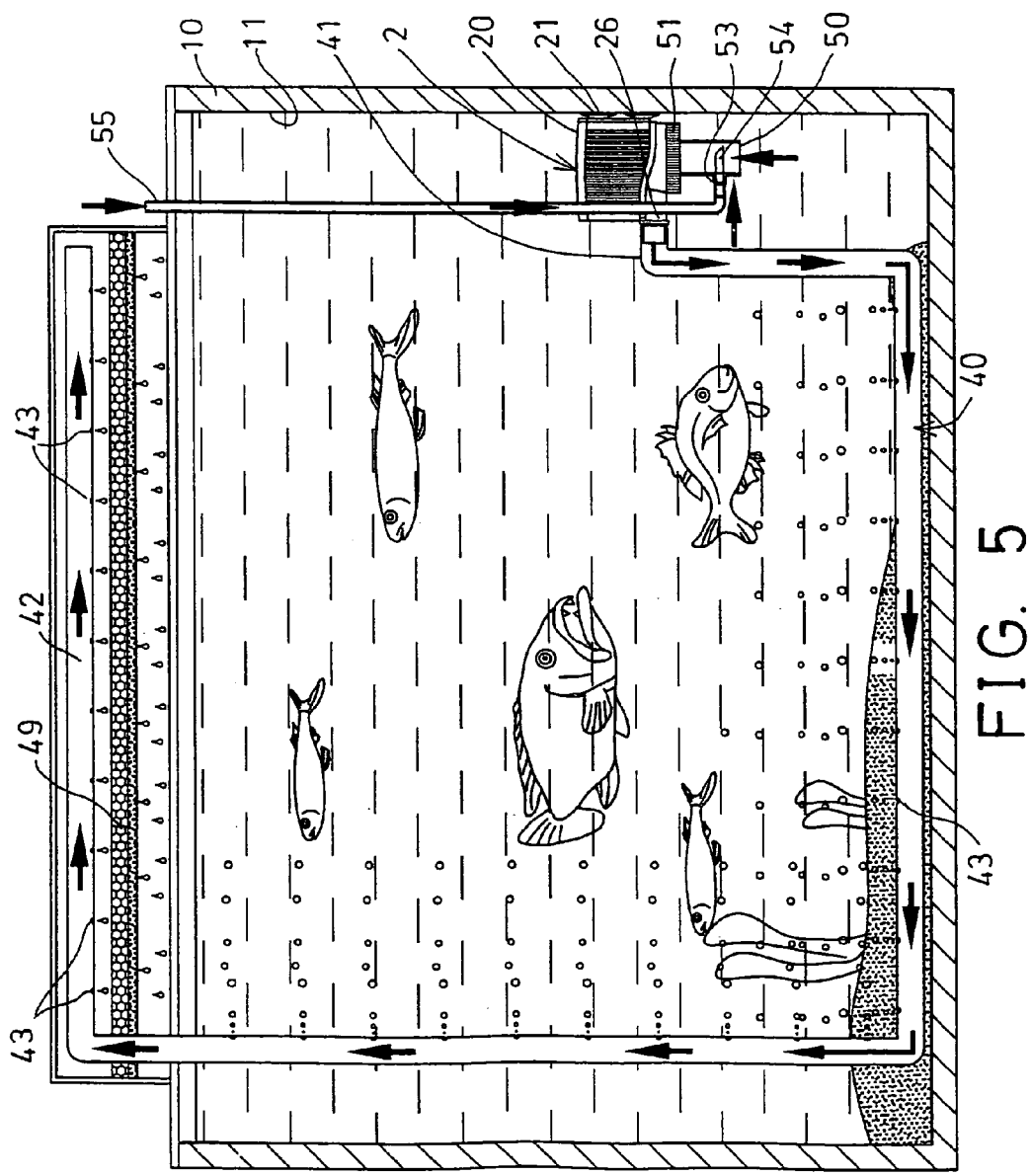
FIGS. 5 and 6 are partial cross sectionals view similar to FIG. 1, illustrating the other applications or operations of the water aerating device for the aquarium.

As shown in FIGS. 1 and 5, a filter device 49 may further be provided and/or selectively disposed on top of the aquarium 10, and disposed below the manifold 42 of the tube 40, to selectively filter the water flowing out through the orifices 43 of the manifold 42. The tube 40 may further include a number of orifices 43 formed therein to smoothly generate and supply air bubbles into the water contained in the aquarium 10 (FIG. 5).

A pipe 50 includes a ferrule 51 formed or provided on one end thereof and having an inner thread 52 provided therein (FIG. 4), for threading with the outer thread 25 of the tub 24 of the container 20, to detachably secure the pipe 50 to the entrance 23 of the container 20. The pipe 50 includes an inlet 53 formed therein.

Figure 6:
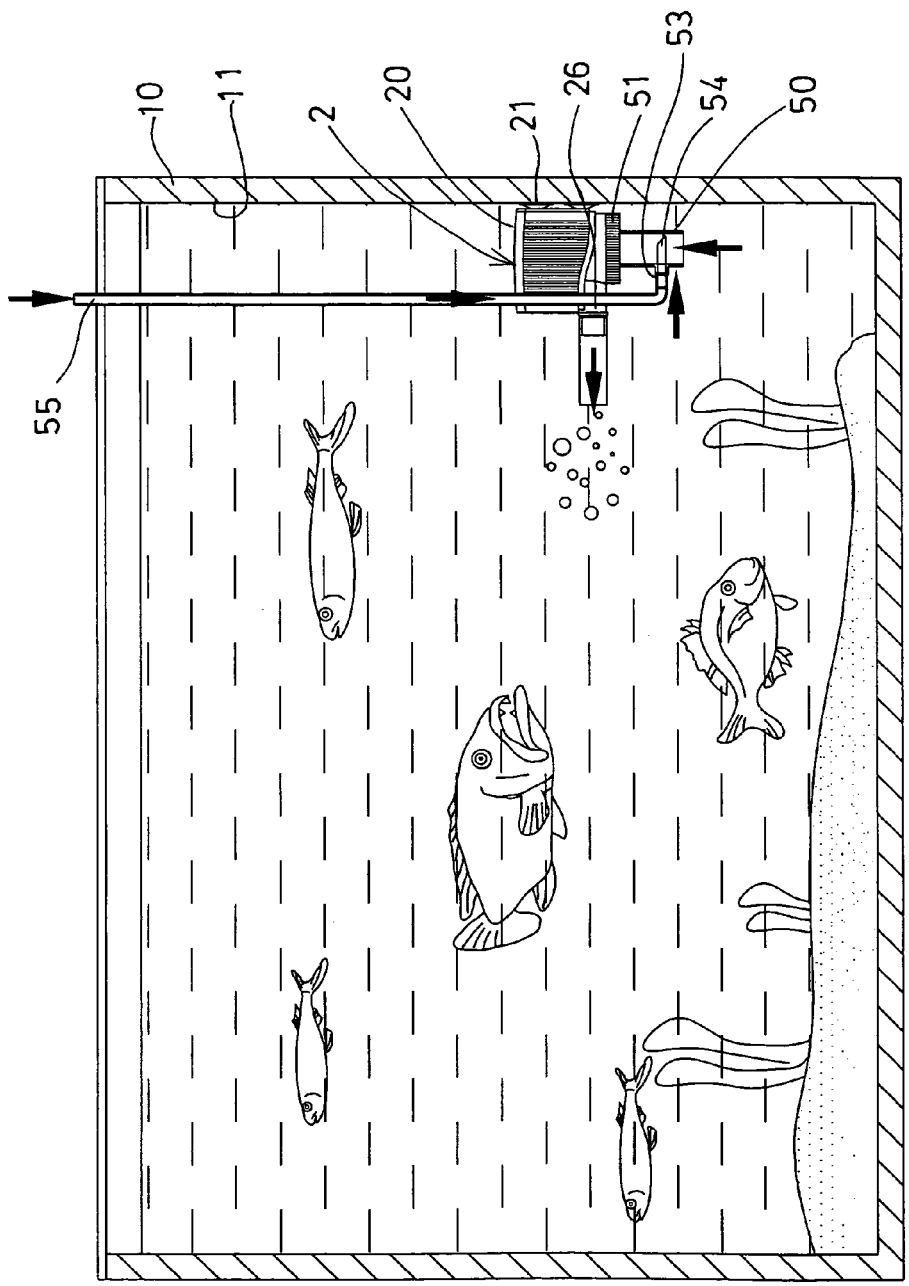

A hose 55 is engaged into or coupled to the inlet 53 of the pipe 50 with a coupler 54, to selectively supply fresh air or other air into the aquarium 10, and thus to suitably supply the air into the water contained within the aquarium 10 (FIGS. 1, and 5–6).

In operation, as shown in FIGS. 1 and 5–6, air, such as fresh air or carbon dioxide or oxygen or the like, may be supplied into the inlet 53 of the pipe 50 via the hose 55, and may then be pumped or drawn into the container 20 together with the water, by the pump 30, to allow the air to be evenly distributed within the water, and to be suitably supplied to fish or plants contained in the aquarium 10.

It is to be noted that the air may be easily supplied into the pipe 50 and may then be pumped or drawn into the container 20 together with the water, by the pump 30, and thus to allow the air to be evenly distributed or suitably supplied to the water contained in the aquarium 10. The single pump 30 may thus be used to pump air into the aquariums, and/or to generate air bubbles, and simultaneously to circulate the water contained in the aquarium 10.

Accordingly, the water aerating device in accordance with the present invention includes may be attached to aquariums to selectively pump air into the aquariums, and for generating bubbles and/or for circulating the water with only one motor or pump.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A water aerating device for an aquarium, said water aerating device comprising:
   a container including a chamber formed therein, and including an entrance and an exit arranged to allow water to flow into and out of said chamber of said container,
   a tube attached to said exit of said container to receive the water from said container, said tube including a port having an outlet to supply the water into the aquarium,
   at least one blade rotatably attached to said port of said tube, for being rotated by the water flowing out of said outlet of said port,
   a pipe attached to said entrance of said container,
   a hose coupled to said pipe, to supply air into said pipe, and
   means for pumping the water from said pipe into said chamber of said container via said entrance of said container, to force the water and the air to flow out through said exit of said container.

2. The water aerating device as claimed in claim 1, wherein said container includes a partition to define said chamber thereof.

3. The water aerating device as claimed in claim 2, wherein said pumping means includes a pump attached to said partition of said container, and includes an axle extended into said chamber of said container, and a fan device attached to said axle of said pump for being driven by said pump, to pump the water into and out of said container, and to circulate the water in said aquarium.

4. The water aerating device as claimed in claim 1, wherein said pipe includes an inlet provided therein, and said hose includes a coupler coupled to said inlet of said pipe.

5. The water aerating device as claimed in claim 1, wherein said container includes a tub to define said entrance of said container, and said pipe includes a ferrule attached onto said tub of said container.

6. The water aerating device as claimed in claim 5, wherein said tub of said container includes an outer thread provided thereon, and said ferrule of said pipe includes an inner thread to thread with said outer thread of said tub of said container.

7. The water aerating device as claimed in claim 1, wherein said container includes at least one sucker member for attaching said container to the aquarium.

8. The water aerating device as claimed in claim 1, wherein said tube includes a manifold having a plurality of orifices to supply the water into said aquarium.

9. The water aerating device as claimed in claim 1, further comprising a frame coupled to said outlet of said port, said fan device is rotatably attached to said frame with a pivot shaft.

* * * * *